United States Patent [19]

Yoshida

[11] 3,895,242
[45] July 15, 1975

[54] NON-LINEAR OPTICAL ELEMENTS
[75] Inventor: Satoshi Yoshida, Saitama, Japan
[73] Assignee: Fuji Photo Film Co., Ltd., Minami Ashigara, Japan
[22] Filed: Dec. 4, 1973
[21] Appl. No.: 421,562

[30] Foreign Application Priority Data
Dec. 4, 1972 Japan.................. 47-12176

[52] U.S. Cl................. 307/88.3; 321/69 R
[51] Int. Cl. ............................. H02m 5/04
[58] Field of Search............. 307/88.3; 321/69 R

[56] References Cited
UNITED STATES PATENTS
3,548,199  12/1970  Geusio et al................ 307/88.3

*Primary Examiner*—R. V. Rolinec
*Assistant Examiner*—Darwin R. Hostetter
*Attorney, Agent, or Firm*—Sughrue, Rothwell, Mion, Zinn & Macpeak

[57] ABSTRACT

A non-linear optical element suitably used for converting the wave length of coherent laser light composed of a crystalline compound represented by the general formula $$CX_nY_{3-n}(NZ)_pCONX_mY_{2-m}$$

wherein X, Y and Z each represents a hydrogen atom or a deuterium atom, $n$ is 1, 2 or 3, $m$ is 1 or 2 and $p$ is 0 or 1.

9 Claims, No Drawings

NON-LINEAR OPTICAL ELEMENTS

BACKGROUND OF THE INVENTION

1. Field of the Invention

The present invention relates to a non-linear optical element and, more particularly, it relates to a non-linear optical element used for converting the wave length of laser light.

2. Description of the Prior Art

Laser techniques have recently been developed to a great extent and it is possible at present to obtain various kinds or types of laser light by utilizing solid media, gas media, and liquid media. In many purposes of applications utilizing coherent laser light, laser light having various wave lengths is required and in a some cases, a laser light exhibiting a continuous spectrum over certain range of wave lengths is required. However, it is difficult to satisfy the aforesaid purposes or requirements even with the various kinds of laser light obtainable at present and hence a means has frequently been employed in which coherent laser light is converted into laser light of the second harmonic, that is to say, laser light of a wave length of which the frequency is twice the fundamental frequency, by passing the laser light through a non-linear optical crystal. Conversion of the wave length of a laser light by a parametric effect using such a non-linear optical element has also been investigated and developed.

From the beginning of the development of laser techniques $KH_2PO_4$ was known as a material for such a non-linear optical element and $KH_2PO_4$ is used at present. This material is soluble in water and by growing the crystal of the material from an aqueous solution thereof, a large crystal of the material having excellent optical homogeneity is obtained. Therefore, $KH_2PO_4$ has often been used as a standard material for comparison of non-linear type optical effects.

As such a typical non-linear optical material, $LiNbO_3$ and $Ba_2NaNb_5O_{15}$ have recently been developed. The intensity of the output of the second harmonic of laser light having a wave length of 0.53 micron obtained by passing the laser light having a wave length of 1.06 microns from a YAG/Nd laser through a crystal of $LiNbO_3$ is about 100 times the intensity of the output of the second harmonic of the laser light obtained by passing the above-described laser light through a crystal of $KH_2PO_4$.

Also, the intensity of the output of the second harmonic of the laser light obtained by passing the above-described laser light through a crystal of $Ba_2NaNb_5O_{15}$ is slightly stronger than the intensity of the second harmonic of the laser light using a crystal of $LiNbO_3$.

Crystals of such oxides are usually produced using the following techniques. That is to say, a crystal of $LiNbO_3$ is obtained by mixing, usually, $Li_2CO_3$ and $Nb_2O_5$ in a molar ratio of 1:1, melting the mixture in a platinum crucible by heating it to about 1260°C, and then cooling the melt. Also, a crystal of $Ba_2NaNb_5O_{15}$ is obtained by mixing $BaCO_3$, $Na_2CO$, and $Nb_2O_5$ in a molar ratio of 4:1:5, melting the mixture at about 1450°C, and then cooling the melt.

Since these oxides have high melting points, it is not easy to produce crystals of $LiNbO_3$ and $Ba_2NaNb_5O_{15}$ having excellent optical homogeneity. Furthermore, since these oxide crystals are ferroelectric substances, the crystals of the oxides produced ordinarily have a ferroelectric multi-domain structure and hence to utilize the oxide crystals in many applications, an additional operation is required to convert the crystals of the oxides into crystals having a single domain structure. In the case of producing the crystal of $Ba_2NaNb_5O_{15}$, however, a further treatment is required to remove the twinning structure formed during the cooling step of the crystal to transform it to the tetragonal system present at 275°C. The operations or treatments of converting the oxide crystals into crystals having a single domain structure and removing the twinning structure of the crystal described above are troublesome and if these treatments are not complete, the crystals of the oxides treated are greatly inferior in efficiency in converting the wave length of laser light as is the case of the oxide crystal having inferior optical homogeneity.

SUMMARY OF THE INVENTION

An object of this invention is, therefore, to provide a non-linear element having a quite excellent optical homogeneity and a high efficiency for the conversion of the wave length of laser light.

Another object of this invention is to provide an excellent non-linear optical element used for the conversion of the wave length of a coherent laser light, which can be prepared readily without the necessity for the above-described troublesome operations.

The inventor has discovered that the above-described objects of this invention can be attained with a crystalline material represented by the general formula $$CX_nY_{3-n}(NZ)_pCONX_mY_{2-m}$$

wherein X, Y and Z each represents a hydrogen atom or a deuterium atom, $n$ is 1, 2 or 3, $m$ is 1 or 2 and $p$ is 0 or 1.

DETAILED DESCRIPTION OF THE INVENTION

The crystalline material of the above-described general formula in which the moiety $CX_nY_{3-n}(NZ)_p$ is a methyl group and the moiety $NX_mY_{2-m}$ is an amino group can be obtained by dehydrating ammonium acetate ($CH_3COONH_4$) under mild heating e.g., up to about 80°C in the presence of a dehydrating agent such as acetic anhydride as shown in the reaction formula (A).

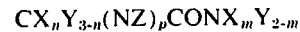

A

The deuterated product of $CH_3CONH_2$ is obtained starting with a deuterated derivative, which can be prepared using commercially available deuterated acetic acid, forming the ammonium salt and conducting a deuterium atom/hydrogen atom exchange, in a similar manner as shown in the following reaction formulae B and C.

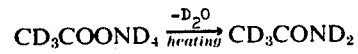

b

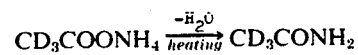

C

In the case of reaction formula (C,) further, $CD_3COND_2$ may be also obtained by repeating the recrystallization of $CD_3CONH_2$ obtained in the manner of reaction formula (C) from heavy water.

Also, the crystalline material of the above-described general formula in which the moiety $CX_nY_{3-n}(NZ)_p$ is a methylamino group and the moiety $NX_mY_{2-m}$ is an amino group can be obtained by reacting nitrourea ($H_2NCONHNO_2$) and methylamine ($CH_3NH_2$) in cold water under cooling.

The deuterated products of the crystalline compound, i.e., $CH_3NHCONH_2$ can also be obtained in a similar manner. Namely, $D_2NCONDCD_3$ can be obtained by reacting $D_2NCONDNO_2$ and $CD_3NH_2$ or $CD_3ND_2$ in heavy water under cooling. Also, $H_2NCONHCD_3$ can be obtained by reacting $H_2NCONHNO_2$ and $CD_3NH_2$ or $CD_3ND_2$ in water under cooling. Furthermore, by repeating the recrystallization of the product $H_2NCONHCD_3$ from heavy water, $D_2NCONDCD_3$ can also be obtained.

Where the X or Y bonded to the nitrogen atom of the $NX_mY_{2-m}$ moiety in the compound shown by the general formula I is a hydrogen atom, it can be substituted with a heavy hydrogen atom by dissolving the compound in heavy water and recrystallizing it therefrom. If the substitution is insufficient in one recrystallization step, the substitution with heavy hydrogen atoms can be increased by repeating the recrystallization step.

Also, in the case of growing single crystals of these compounds, the compound of general formula I is dissolved in water, while the deuterated product of the compound of general formula I is dissolved in heavy water to form, in both cases, saturated solutions and then the solution is cooled slowly. If necessary, a seed crystal may be added to the saturated solution before cooling.

Since the non-linear crystalline materials of this invention are soluble in water, they must be protected from high humidity conditions or moisture when the crystalline materials are stored or used for a long period of time but the protection can be easily practiced by placing the materials in a desicator or by covering the surfaces of the crystals with an appropriate transparent material, e.g., acrylic or methacrylic resins.

The non-linear optical materials thus obtained can be maintained at temperatures lower than the melting points of the materials, e.g., at temperatures lower than 69°–82°C in the case of $CH_3CONH_2$ and lower than 101°C in the case of $CH_3NHCONH_2$. Furthermore, although there are no particular limitations with respect to humidity conditions, it is usually necessary that the materials of this invention be stored under a humidity below 20% and further it is desirable to store the materials in dry vessels. Also, as described above, the surface of the materials can be covered with a transparent material such as an acrylic resin film to protect them from moisture.

Since the crystal of the non-linear optical material of this invention is grown from an aqueous solution thereof, the rate of crystal growth of the material is much lower than that of a crystal grown from a melt and further the crystalline material of this invention is quite excellent in optical homogeneity as compared with a crystal grown from a melt.

When a laser light having a wave length of 1.06 microns from a YAG/Nd laser is passed through a crystal of $CH_3CONH_2$ or $CH_3NHCONH_2$, which is one of the non-linear optical materials of this invention, the intensity of the output of the second harmonic (0.53 micron) of the laser light is about 100 times the intensity of the output of the second harmonic when a crystal of $KH_2PO_4$ is used, that is to say, the output of the second harmonic is the same as that obtained using $LiNbO_3$. These results mean that the crystals of $CH_3CONH_2$ and $CH_3NHCONH_2$ have a high wave length conversion efficiency, the same as that of $LiNbO_3$.

Also, it has been observed that in the case of using the crystal of $CD_3COND_2$ or $CD_3NDCOND_2$ of this invention, the output of the second harmonic of laser light has an intensity which is the same as that using the above-described linear optical material of this invention.

As described above, the non-linear optical elements or materials of this invention have excellent optical homogeneity or a high efficiency in the conversion of the wave length of laser light and further can be produced without the necessity of conducting the treatments for reforming into a single domain structure and removing twinning structures.

While the invention has been described in detail and with reference to specific embodiments thereof, it will be apparent to one skilled in the art that various changes and modifications can be made therein without departing from the spirit and scope thereof.

What is claimed is:

1. A process for converting the wave length coherent laser light into a second wave length which comprises passing said laser light through a non-linear optical element comprising a crystal of a compound represented by the general formula $$CX_nY_{3-n}(NZ)_pCONX_mY_{2-m}$$

wherein X, Y and Z each represents a hydrogen atom or a deuterium atom, $n$ is 1, 2 or 3, $m$ is 1 or 2 and $p$ is 0 or 1.

2. The process of claim 1, wherein said crystal of said compound is $CH_3CONH_2$.

3. The process of claim 1, wherein said crystal of said compound is $CH_3NHCONH_2$.

4. The process of claim 1, wherein said crystal of said compound is $CD_3COND_2$.

5. The process of claim 1, wherein said crystal of said compound is $CD_3CONH_2$.

6. The process of claim 1, wherein said crystal of said compound is $D_2NCONDCD_3$.

7. The process of claim 1, wherein said crystal of said compound is $H_2NCONHCD_3$.

8. The process of claim 1, wherein said crystal of said compound contains a mixture of hydrogen atoms or deuterium atoms.

9. The process of claim 1, wherein said second wave length is a harmonic of said first wave length.

* * * * *

UNITED STATES PATENT AND TRADEMARK OFFICE
CERTIFICATE OF CORRECTION

PATENT NO. : 3,895,242
DATED : July 15, 1975
INVENTOR(S) : Satoshi YOSHIDA

It is certified that error appears in the above—identified patent and that said Letters Patent are hereby corrected as shown below:

IN THE HEADING:

The claimed Priority Data is incorrect. Should read:

--December 4, 1972    Japan............47-121760--

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*